US007484180B2

(12) United States Patent
McCormack et al.

(10) Patent No.: US 7,484,180 B2
(45) Date of Patent: Jan. 27, 2009

(54) GETTING STARTED EXPERIENCE

(75) Inventors: Michael J. McCormack, Snohomish, WA (US); Christopher W. Bryant, Seattle, WA (US); George Fordham, Seattle, WA (US); Jonathan A. McPherson, Redmond, WA (US); Scott T. Gardner, Seattle, WA (US); Clinton Dee Covington, Kirkland, WA (US); Daniel Hough, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 11/268,686

(22) Filed: Nov. 7, 2005

(65) Prior Publication Data

US 2007/0106951 A1 May 10, 2007

(51) Int. Cl.
*G06F 3/00* (2006.01)
(52) U.S. Cl. .................. 715/764; 715/765; 715/738; 715/744; 715/825; 715/826
(58) Field of Classification Search ......... 715/762–765, 715/781, 825, 826, 734–747
See application file for complete search history.

(56) References Cited

U.S. PATENT DOCUMENTS

2001/0052910 A1* 12/2001 Parekh et al. ............... 345/744
2002/0184233 A1* 12/2002 Schneider .................. 707/104.1
2003/0018622 A1* 1/2003 Chau ............................. 707/3
2003/0126157 A1* 7/2003 Young et al. ................. 707/200
2005/0004955 A1* 1/2005 Lee et al. .................... 707/203
2005/0268279 A1* 12/2005 Paulsen et al. .............. 717/110
2006/0053369 A1* 3/2006 Kalajian et al. ............. 715/517
2006/0161881 A1* 7/2006 Saad et al. .................. 717/104
2006/0253586 A1* 11/2006 Woods ....................... 709/226
2007/0027861 A1* 2/2007 Huentelman et al. ........... 707/5
2007/0061428 A1* 3/2007 Haley et al. ................. 709/220

OTHER PUBLICATIONS

Sue Dickinson, From Office XP to Office 2003, May 2005.*

* cited by examiner

*Primary Examiner*—Tadeese Hailu
(74) *Attorney, Agent, or Firm*—Merchant & Gould P.C.

(57) ABSTRACT

A one-screen entry point to a document management program ("program") is provided to allow a user to browse templates associated with the program. The templates can be local templates and/or online templates provided by one or more Web services. The one-screen entry point allows a user to search, browse, or download online templates, and/or create documents using the templates. Each template is identified with a template category and displayed together with templates identified with the same template category. Local templates are presented along with online templates if the local templates and the online templates are identified with the same online template category. A user or an administrator of the program can create and/or customize local templates and local template categories. A blank template is provided so a user can create custom documents for the program.

17 Claims, 4 Drawing Sheets

GETTING STARTED EXPERIENCE

BACKGROUND

Conventionally, document management program such as Microsoft Word® or Microsoft Access® provides a static presentation of objects when a user opens the software program. In other words, the getting started experience for a conventional document management program tends to be static: The experience does not integrate with dynamic information such as information available through a Web service or information accumulated from previous use of the program. Nowadays, with the continued development of the Internet and Internet content, it is desirable to integrate relevant online information into a document management program so that the program is able to expand in features and functionalities. It is also desirable to integrate relevant online information with information local to the system hosting the document management program. Further, it is desirable to present information accumulated from previous use of a document management program in the getting started experience of the program. Furthermore, it is desirable to allow an end user or customer of the document management system to customize the getting started experience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention addresses the above-identified needs by providing a getting started experience user interface for a document management program such as Microsoft Access® or Microsoft Word®. Such a user interface provides a one-screen entry point for a user of the document management program. The user interface includes features that allow a user of the program to browse, search, and download templates for the program. The templates can be local templates existing on the computer system hosting the program. The templates can also be online templates supplied by one or more Web services. Each of the templates is identified with a template category. Templates identified with the same template category are presented together in the user interface. This means that for templates identified with the same template category, whether a template is a local template or an online template is transparent to a user of the program.

According to one aspect of the invention, the getting started experience user interface includes a navigation pane. The navigation pane includes a local template section and an online template section. Selection of either section expands the section into template categories associated with the section. If the program is not connected to the Web service supplying online templates for the program, selection of an online category displayed in the navigation pane will only display local templates identified with the online category. In the case online templates are permanently blocked from the document management program, the online template section is not displayed in the navigation pane.

The navigation pane may also include a featured templates section identifying featured templates for the program. The featured templates may include a blank template that can be used to create custom documents for the program. The featured templates may also include featured local templates and/or featured online templates if the program is connected with a Web service supplying the online templates. The navigation pane may further include a Back button, the actuation of which returns the getting started experience user interface to previous step in the navigation sequence.

The getting started experience user interface may further include a browse pane for displaying featured templates or the templates associated with a template category selected in the navigation pane. The user interface may further include a preview panel. The preview panel displays preview information of a template selected in the browse pane. The preview information may disclose the name, location, size, and/or download time of the selected template. The preview information may also allow a user to configure whether to create a document using the selected template on a knowledge management system such as Microsoft SharePoint® so that the document can be shared with others. If the selected template is an online template, a user may actuate a Download button supplied by the user interface to download the online template and create a document using the downloaded online template. A user may also actuate a Create button in the user interface to create a document based on a selected local template. A user may also actuate a Cancel button to bring the user interface back to its initial point.

The getting started experience user interface may further provide a most recently used ("MRU") list. The MRU list enumerates documents that have been recently accessed.

Other aspects of the invention allow customization of the getting started experience of a document management program. For example, a user or an administrator of the document management program may create new local templates and local template categories, and/or customize existing local templates and local template categories. A user or an administrator of the program can also configure the program to receive or not receive online templates, featured online templates, or other online content.

In summary, aspects of the invention provide a getting started experience for a document management program. The getting started experience allows a user to browse, search, and access templates for the program from one entry point. The getting started experience also allows a user or an administrator of the program to customize the getting started experience. Aspects of the invention also integrate relevant online content with the program by accepting and integrating information supplied by Web services into the getting started experience of the program.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the invention provide a one-screen entry point for a user of a document management program. The one-screen entry point, also named the getting started experience user interface for the document management program, includes features that allow the user to browse templates associated with the document management program, documents that have been recently accessed, as well as online content provided through a Web service. The templates may be local templates existing on the local system hosting the document management program. The templates can also be online templates provided by one or more Web services such as Microsoft Office™ online service. In embodiments of the invention, the templates are classified into different categories. A local template may be presented in an online template category folder in the getting started experience if the local template's category matches an existing online template category. The getting started experience may also present featured local templates and featured online templates. Embodiments of the invention also present a most recently used ("MRU") list in the getting started experience. The MRU list enumerates documents that have been recently accessed.

Embodiments of the invention allow customization of the getting started experience of a document management program. For example, administrators of the local system hosting the document management program may create new local templates and local template categories. The administrators can also customize existing local templates and local template categories. Furthermore, the administrators may turn on or off the one or more Web services that supply online information such as online templates for the document management program. When the document management program is connected with the Web service(s), the getting started experience of the program allows a user to search, preview, and download online templates supplied by the Web service(s). In addition, the getting started experience may also provide a blank template that a user of the document management program may use to create custom documents.

Figure 1:
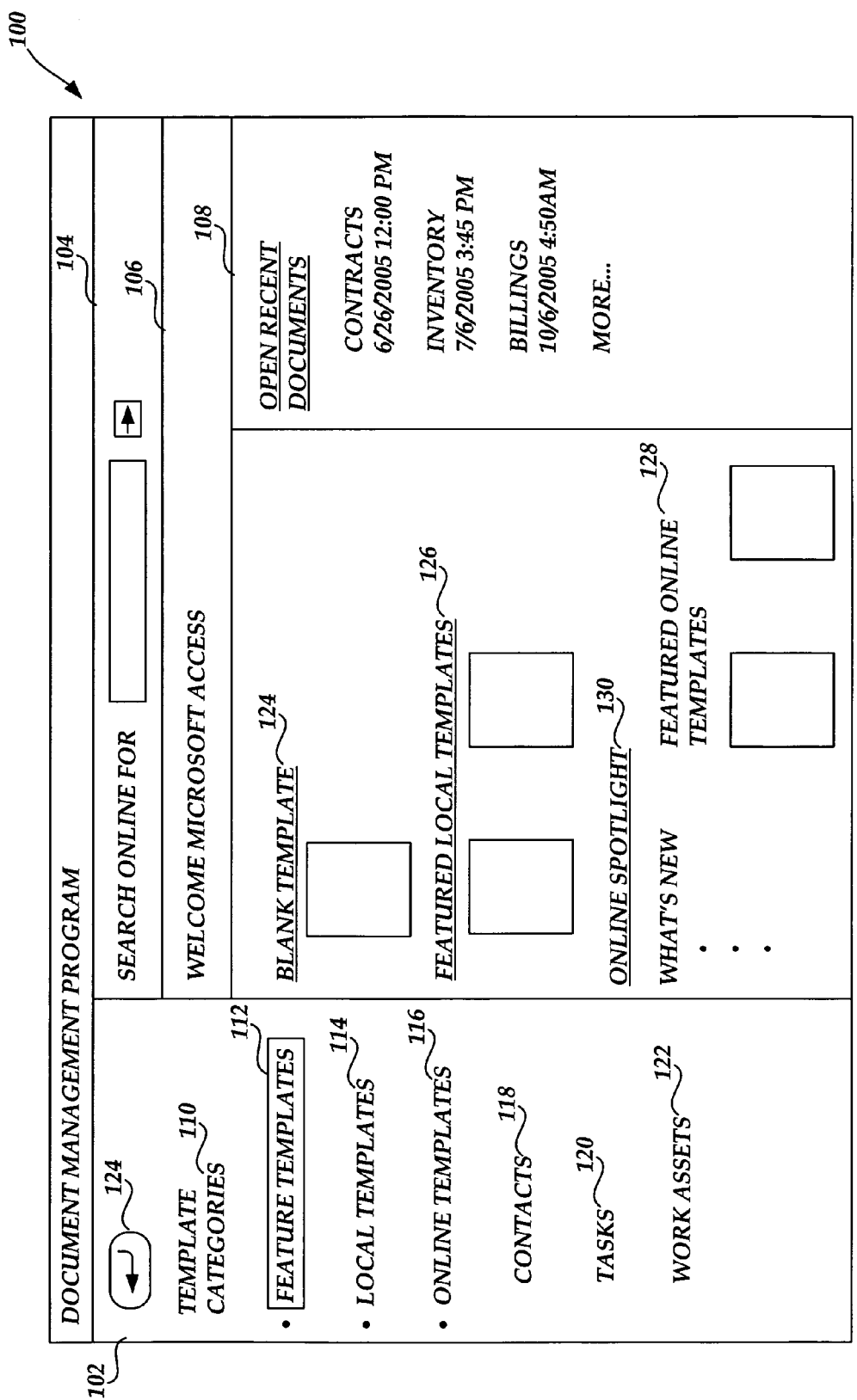
FIG. 1 is a pictorial diagram illustrating an exemplary initial page of a getting started experience user interface for a document management program.

FIG. 1 is a block diagram illustrating an exemplary implementation of the getting started experience user interface for a document management program such as Microsoft Access®. The exemplary getting started experience user interface is illustrated as a graphic user interface ("UI") 100. FIG. 1 illustrates the initial presentation of the UI 100. As shown in FIG. 1, the UI 100 includes a navigation pane 102, a search control 104, a browse pane 106, and an MRU list 108.

The navigation pane 102 allows a user to navigate a template categories 110 list to identify the desired template category. In an exemplary implementation of the UI 100, the template categories 110 list includes a featured templates section 112, a local templates section 114, and an online templates section 116.

In embodiments of the invention, the selection of the featured templates section 112 dynamically generates a list of featured templates, which are displayed in the browse pane 106. In an exemplary embodiment of the invention, the featured templates may include a blank template 124 which a user can customize into a custom document, featured local templates 126, and featured online templates 128. The featured templates may include templates that have been used during the last boot of the document management program, templates that are recommended by the Web service(s) supplying online templates for the document management program, and templates designated as featured templates by an administrator of the document management program. In an exemplary embodiment of the invention, displayed along with the featured online templates 128 is an online spotlight 130 that provides links to content items on the Web service supplying the online templates for the document management program. Preferably, the online spotlight 130 is a self-contained user interface element so that it can be repositioned and restructured, as necessary.

In an exemplary embodiment of the invention, when the document management program starts, the featured templates section 112 is selected by default and may appear first in the template categories 110 list; and the corresponding featured templates are displayed by default in the browse pane 106.

In an exemplary embodiment of the invention, when the local templates section 114 or the online templates section 116 is selected, the selected section expands into a list of template categories associated with the selected section. The local templates section 114 is dynamically generated by congregating the local templates for the document management program. These local templates include templates specific to the user currently using the program and templates applicable for all users of the program.

In an exemplary embodiment of the invention, each template is associated with a specific string identifying the category that the template belongs to. The specific string associated with the template is compared with the category strings defined in the registry of the local system to avoid conflicts between local template categories and online template categories. In exemplary embodiments of the invention, any template category not included in the online templates section 116 is included in the local templates section 114. Contrawise, if the category that a local template is associated with is an online category, the local template will be displayed as a template within the online category in the online template section 116. Whether a template is local or online is transparent to a user who is browsing the online category. In the case that the online templates section 116 is disabled, for example, by IT personnel who do not want the document management program to receive online templates, all local templates will be displayed in the local templates section 114.

In embodiments of the invention, a document management program, such as the Microsoft Access® program, may be connected to at least one Web service that supplies online templates for the program. The scope of the Web service is arbitrary. It can be as wide as the Internet, or be a specific Web service such as the Microsoft Office™ Online program. In embodiments of the invention, when selected, the online templates section 116 displays all online template categories containing one or more online templates. As noted above, in exemplary embodiments of the invention, the online templates section 116 integrates local templates that are identified with online categories. As illustrated in FIG. 1, the online templates section 116 includes exemplary template categories contacts 118, tasks 120, and work assets 122.

The navigation pane 102 may also provide a Back button 124, the selection of which leads the UI 100 back to previous navigation sequences.

In exemplary embodiments of the invention, local templates or local template categories may be customized or created according to the preferences of a user or an administrator of the document management program. For example, if an administrator wants to create a solution for determining the inventory of machines existing in a network, the administrator can create a custom template and a custom template category named, for example, Machine Inventory. The Machine Inventory category then shows up in the local templates section 114 and the custom template is associated with a string identifying the Machine Inventory category. An administrator of the program may also decide to disallow the program to receive any online templates. The administrator may do so by disconnecting the Web service(s) supplying online templates from the program. As a result, the online templates section 116 will not be displayed.

In addition to the ability to customize or create local templates and local template categories and the ability to turn off the connection to a Web service supplying online templates for a document management program, embodiments of the invention also allow a user to create custom documents by using a blank template. As noted above, in an exemplary embodiment of the invention, upon the selection of the featured templates section 112, the browse pane 106 displays a blank template 124. A user can instantiate the blank template 124 and customize it for a specific need. For example, a user can use the blank template 124 to pre-define a document that can function as a template, i.e., being reused again and again. In an exemplary embodiment of the invention, the blank template 124 is also used when a user creates a blank document for the document management program.

The UI 100 further contains a self-contained user interface element MRU list 108. The MRU list 108 provides links to documents that have been recently used. In an exemplary embodiment of the invention, the MRU list 108 identifies the name of the document and the time when the document was last accessed. Preferably, when the size of a document is approaching a pre-designated maximum limit, a warning message is presented to the user. The warning message may be presented in various forms. For example, the warning message can be to display the link to a document in an alerting color when the size of the document is approaching the maximum limit.

In exemplary embodiments of the invention, the UI 100 may further include a search control 104 which allows a user to search online for a specific template.

Figure 2:
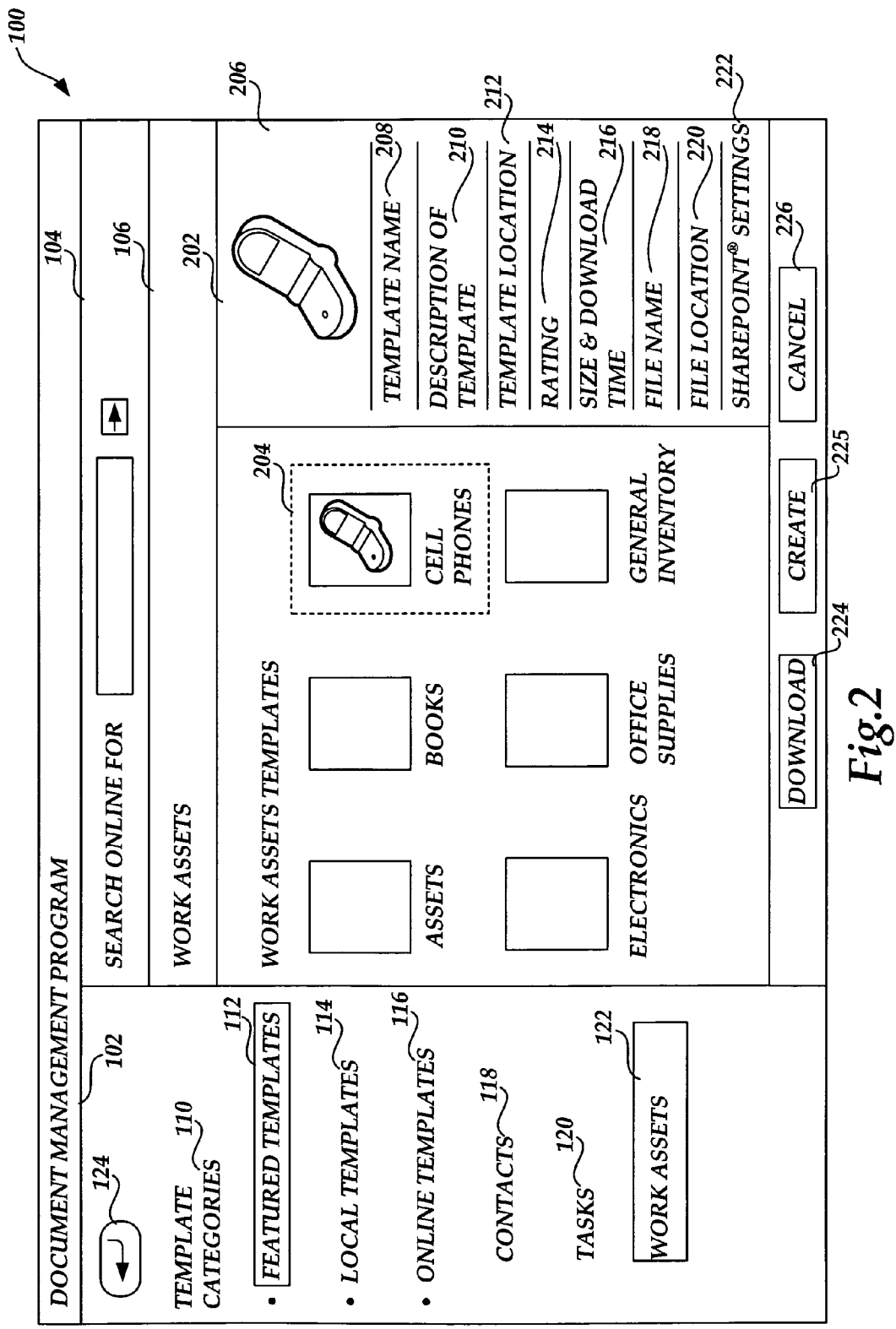
FIG. 2 is a pictorial diagram illustrating another exemplary page of the getting started experience user interface illustrated in FIG. 1.

In embodiments of the invention, after a user selects a specific template category in the navigation pane 102, the browse pane 106 displays the templates associated with the specific template category. In exemplary embodiments of the invention, when a template category in the online templates section 116 is selected, a query is sent to the Web service to search what templates belong to the selected template category. The browse pane 106 then displays the icons or thumbnail images of all the templates associated with the selected category. FIG. 2 illustrates an exemplary implementation of the UI 100 when a specific template category in the navigation pane 102 is selected. As shown in FIG. 2, when the work assets category 122 is selected in the navigation pane 102, the browse pane 106 displays all the templates associated with the work assets category 122. Because local templates can be associated with an online template category, the displayed templates may be local templates and/or online templates.

In an exemplary embodiment of the invention, when one of the templates in the browse pane 106 is selected, the UI 100 replaces the MRU list 108 with a preview panel 202 that displays all preview information concerning the selected template. For example, as shown in FIG. 2, when one of the displayed templates, cell phones 204, is selected, the preview panel 202 presents preview information concerning the cell phones template 204. For example, as illustrated in FIG. 2, the preview panel 202 displays a preview graphic 206 of the selected template 204. The preview panel also displays the corresponding template name 208 and the template location 212. The preview panel 202 may also provide a description 210 of the selected template. Additionally, the preview panel 202 may also provide a rating 214 of the selected template if it is an online template. The rating 214 may be provided by other users of the selected template. The preview panel 202 may also identify the size and download time 216 of the selected template. Furthermore, the file name 218 and the file location 220 of the selected template may also be identified.

Figure 3:
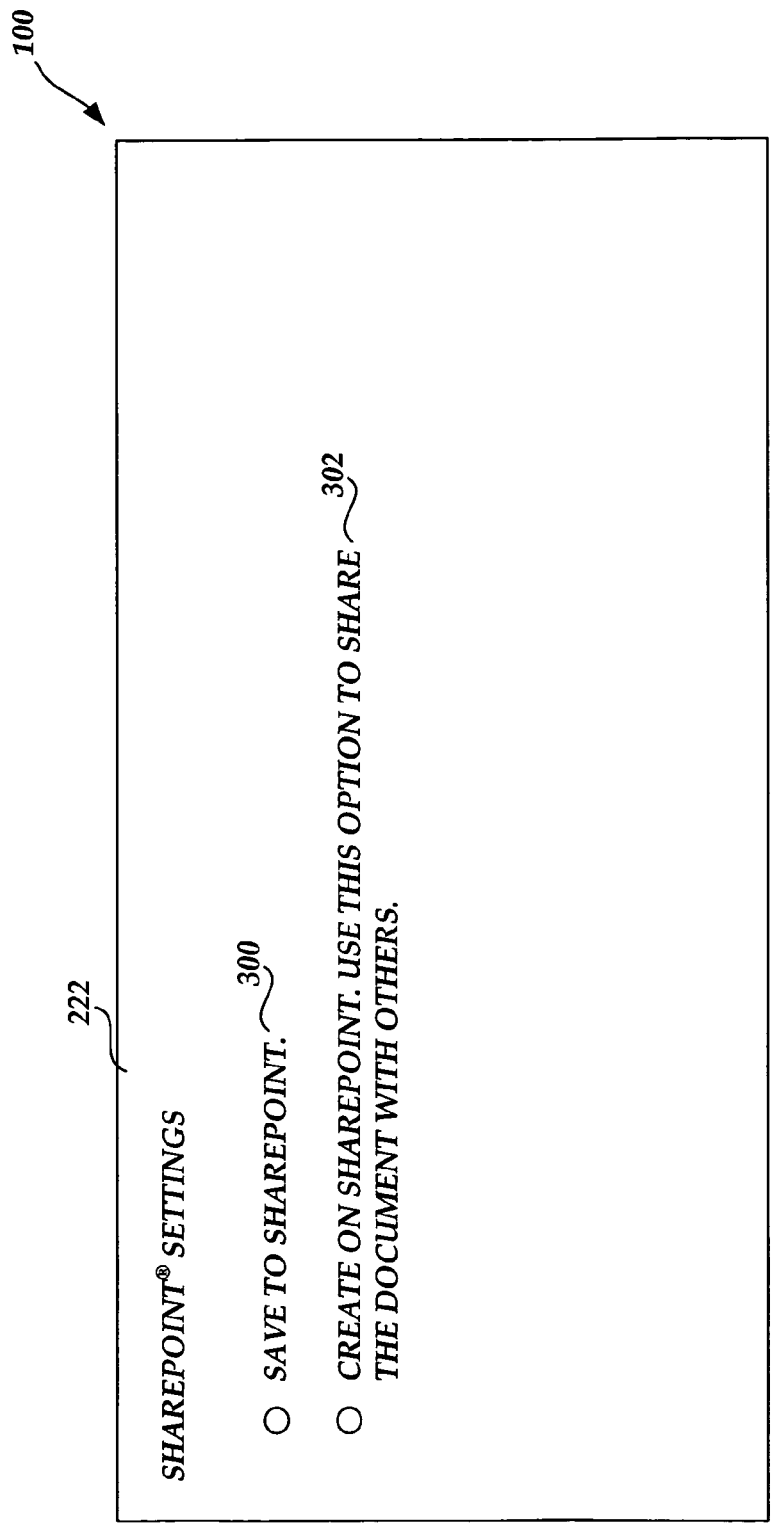
FIG. 3 is a pictorial diagram illustrating an exemplary page of the getting started experience user interface illustrated in FIG. 2 for configuring Microsoft SharePoint® settings.

In an exemplary embodiment of the invention, services provided by a knowledge management system such as Microsoft SharePoint® are integrated into the getting started experience of a document management program so the documents created can be shared with other users. For example, in the exemplary UI 100, the preview panel 202 includes SharePoint® settings 222 for the selected template 204. FIG. 3 illustrates an exemplary UI 100 showing an exemplary configuration of the SharePoint® settings 222. The exemplary SharePoint® settings 222 have two options: A Save to SharePoint® option 300, and Create on SharePoint® option 302. These two distinct options have important differences. For example, assuming the document is a database, selecting the Save to SharePoint® option 300 means that all the tables associated the database are created within the database itself and cannot be shared with other databases. On the contrary, if a database is created using the Create on SharePoint® option 302, the tables associated with the database are published on a SharePoint® and can be shared with other databases when needed. The database created using these tables is linked to the SharePoint®. Alternatively, the SharePoint® settings 222 may contain only the Create on SharePoint® option 302.

Returning to FIG. 2, when a user is satisfied with the preview information presented concerning a selected template such as the selected template 204, the user may actuate the Download button 224 to download the selected template if it is an online template and to create a document using the downloaded online template. A user may also actuate the Create button 225 to use the selected template to create a document if the selected template is a local template. Optionally, a user may actuate the Cancel button 226, which brings the user back to the original screen of the UI 100 as shown in FIG. 1.

In embodiments of the invention, the local system hosting the document management program is a computer system including at least a display for presenting the getting started experience user interface such as the UI 100. The computer system may also include a user-interface selection device, which a user can use to interact with the UI 100, such as to browse, search, select, download, and create templates for a document management program. The user-interface selection device can be a mouse, a touch-screen input device, etc.

Figure 4:
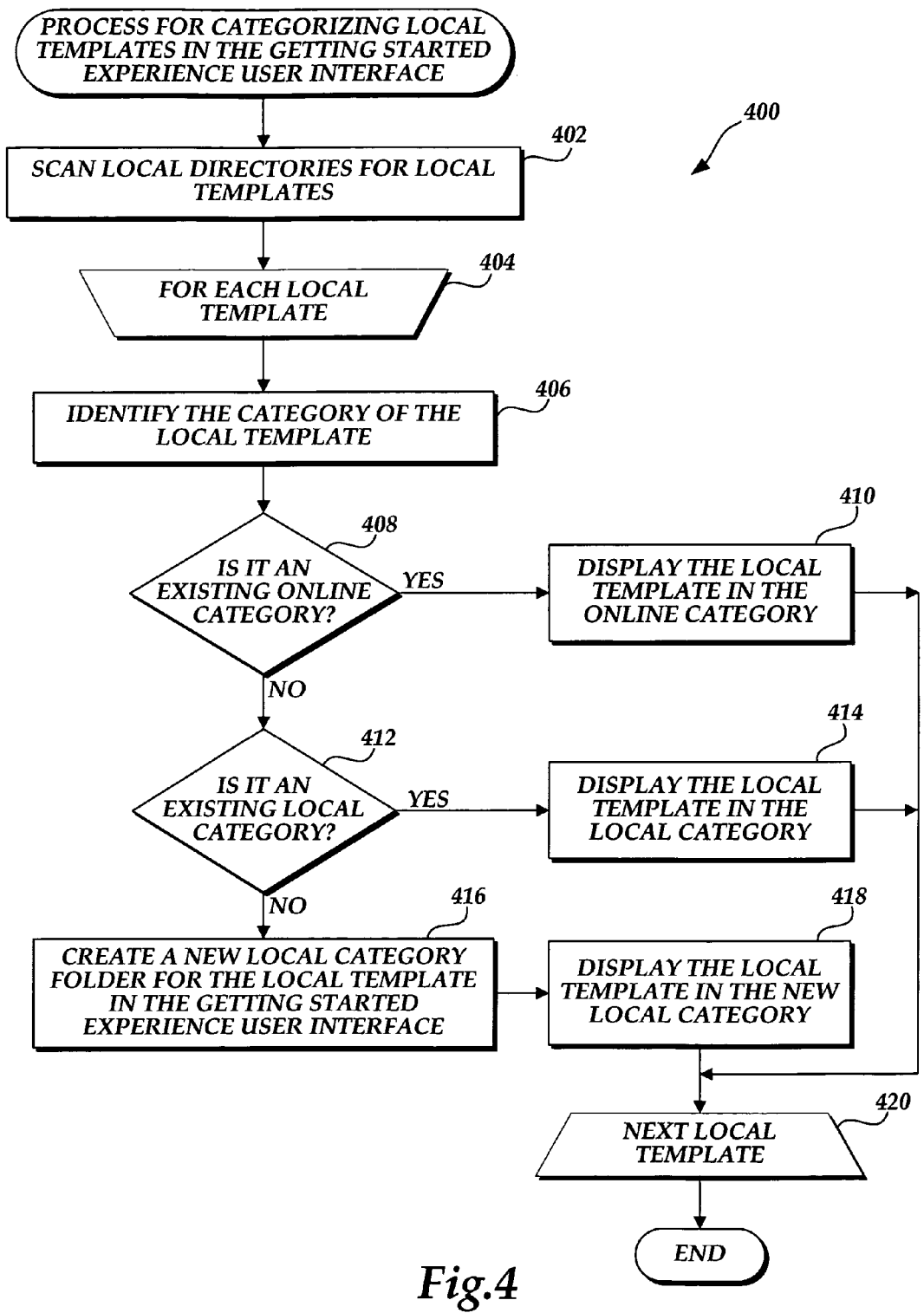
FIG. 4 is a flow diagram illustrating an exemplary process for categorizing local templates in the getting started experience user interface.

FIG. 4 is a flow diagram illustrating an exemplary process 400 for categorizing local templates in a getting started experience user interface, such as UI 100, for a document management program. In essence, the process 400 presents local templates associated with an online template category with online templates associated with the same online category. If a local template is not associated with an online category, the local template is displayed as a template in the corresponding local template category in the getting started experience user interface. Specifically, the process 400 starts by scanning directories in the local system hosting the document management program. See block 402. The process 400 then processes all the local templates associated with the document management program. The process 400 enters a loop defined between the block 404 and the block 420. For each local template, the process 400 identifies the template category associated with the local template. See block 406. The identification can be done by comparing a specific string associated with the local template. The specific string identifies the category of the local template. Alternatively, a category ID may be associated with the local template. Either the specific string or the category ID can be used to identify the category of the local template. Upon identifying the template category of the local template, the process 400 proceeds to determine whether the template category is an existing online category. See decision block 408. If the answer to decision block 408 is YES, the process 400 displays the local template when the existing online template category is selected. See block 410. That is, when a user selects the existing online category through the getting started experience user interface, the local template is displayed along with online templates associated with the online category. The process 400 then proceeds to process the next local template.

If the answer to decision block 408 is NO, meaning that the category of the local template is not an existing online category, the process 400 proceeds to determine whether the category of the local template is an existing local template category. See decision block 412. If the answer to decision block 412 is YES, the process 400 displays the local template when a user selects the local template category through the getting started experience user interface. See block 414. The process 400 then proceeds to process the next local template.

If the answer to decision block 412 is NO, meaning that there is no existing local template category match to the category of the local template, the process 400 proceeds to create a folder for the category of the local templates in the local templates section of the getting started experience user interface. See block 416. The process 400 then displays the local template when the new local template category is selected. See block 418. The process 400 then proceeds to process the next local template. See block 420. Once the process 400 has processed all the local templates associated with the document management program, the process 400 terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of browsing one or more templates of a program on a computer system via a single-screen entry point user interface having a plurality of panes, the method comprising:
    receiving a signal indicating starting of the program; and
    presenting a navigation pane on a display upon receiving the signal indicating starting of the program, wherein the navigation pane is programmed to navigate a plurality of document template categories, each of the plurality of template categories including one or more templates accessible to a user; and
    organizing the template categories into sections including:
        expanding a local templates section, when selected, into a local template list of one or more template categories existing on the computer system, the local template list being presented to the user while the navigation pane continues to be displayed;
        expanding an online templates section, when selected, into an online template list of one or more online template categories if the program is connected to a Web service, the online template list being presented to the user while the navigation pane continues to be displayed; and
        generating a featured templates section, when selected, including a featured template list of featured templates, wherein the featured templates includes at least one blank template, one or more featured local templates, and one or more featured online templates if the program is connected to the Web service.

2. The method of claim 1, further comprising:
    upon receiving a signal indicating booting of the program, presenting on the display:
        a first button, an actuation of which returns the single-screen entry point user interface to a previous navigation sequence;
        a second button, an actuation of which creates a document using a selected local template; and
        a third button, an actuation of which downloads a selected online template to the computer system and creates a document using the downloaded online template.

3. The method of claim 2, further comprising:
    upon receiving a signal indicating booting of the program, presenting on the display:
        a fourth button, the actuation of which cancels any input by a user.

4. The method of claim 1, further comprising:
    upon receiving a signal indicating booting of the program, presenting on the display:
        a browse pane, which displays each of the templates identified with a template category, upon receiving a signal indicating that the template category is selected in the navigation pane by the user-interface selection device.

5. The method of claim 4, wherein the browse pane displays additional information provided by the Web service.

6. The method of claim 4, further comprising:
    upon receiving a signal indicating that one of the templates displayed in the browse pane is selected by the user-interface selection device, displaying on the device:
        a preview panel for presenting preview information about the template.

7. The method of claim 6, wherein the preview information includes any item selected from the group consisting of: name of the template, description of the template, a location of the template, a rating of the template if the template is an online template, a size of the template, a time needed to download the template if the template is an online template, a file name of the template, a file location of the template, and document sharing settings.

8. The method of claim 7, wherein the document sharing settings allow a user to configure whether to create a document using the template on a knowledge management system that allows the document to be shared.

9. The method of claim 4, further comprising displaying the featured templates in the browse pane.

10. The method of claim 1, wherein the blank template is used to create a custom document for the program.

11. The method of claim 1, further comprising:
    upon receiving a signal indicating booting of the program, presenting on the display:
        a most recently used list displaying links to documents that have been recently used.

12. The method of claim 11, wherein the most recently used list presents a warning message if file size of one of the documents is approaching a maximum limit.

13. The method of claim 12, wherein the warning message is to highlight the link to the document in an alerting color.

14. The method of claim 1, wherein the program is connected to the Web service is configurable using the user-interface selection device.

15. The method of claim 1, further comprising:
upon receiving a signal indicating booting of the program, presenting on the display:
a search control element that allows the user to search the online templates of the program.

16. The method of claim 1, further comprising displaying a local template in one of the online template categories if the local template is identified with the one online template category.

17. A method of browsing one or more templates of a program on a computer system via a single-screen entry point user interface having a plurality of panes, the method comprising:
receiving a signal indicating starting of the program;
presenting a navigation pane on a display upon receiving the signal indicating starting of the program, wherein the navigation pane is programmed to navigate a plurality of document template categories, each of the plurality of template categories including one or more templates accessible to a user;
organizing the template categories into sections including:
expanding a local templates section, when selected, into a local template list of one or more template categories existing on the computer system, the local template list being presented to the user while the navigation pane continues to be displayed;
expanding an online templates section, when selected, into an online template list of one or more online template categories if the program is connected to a Web service, the online template list being presented to the user while the navigation pane continues to be displayed; and
generating a featured templates section, when selected, including a featured template list of featured templates, wherein the featured templates includes at least one blank template, one or more featured local templates, and one or more featured online templates if the program is connected to the Web service;
wherein, upon receiving a signal indicating booting of the program, presenting on the display:
a browse pane, which displays each of the templates identified with a template category, upon receiving a signal indicating that the template category is selected in the navigation pane by the user-interface selection device, wherein the browse pane displays additional information provided by the Web service;
a most recently used list displaying links to documents that have been recently used, wherein the most recently used list presents a warning message if file size of one of the documents is approaching a maximum limit, and wherein the warning message is to highlight the link to the document in an alerting color;
a search control element that allows the user to search the online templates of the program; and
a fourth button, an actuation of which cancels any input by a user;
wherein, upon receiving a signal indicating that one of the templates displayed in the browse pane is selected by the user-interface selection device, displaying on the device a preview panel for presenting preview information about the template, wherein the preview information includes any item selected from the group consisting of: name of the template, description of the template, a location of the template, a rating of the template if the template is an online template, a size of the template, a time needed to download the template if the template is an online template, a file name of the template, a file location of the template, and document sharing settings, wherein the document sharing settings allow a user to configure whether to create a document using the template on a knowledge management system that allows the document to be shared;
wherein the program connected to the Web service is configurable using the user-interface selection device; and
wherein the blank template is used to create a custom document for the program.

* * * * *